US009935517B2

(12) United States Patent
Tateishi (10) Patent No.: US 9,935,517 B2
(45) Date of Patent: Apr. 3, 2018

(54) ELECTRIC MOTOR FOR POWER STEERING APPARATUS OF VEHICLE

(71) Applicants: DENSO CORPORATION, Kariya, Aichi-pref. (JP); ASMO CO., LTD., Kosai, Shizuoka-pref. (JP)

(72) Inventor: Yusuke Tateishi, Kosai (JP)

(73) Assignees: DENSO CORPORATION, Kariya, Aichi-pref. (JP); ASMO CO., LTD., Kosai, Shizuoka-pref. (JP)

( * ) Notice: Subject to any disclaimer, the term of this patent is extended or adjusted under 35 U.S.C. 154(b) by 244 days.

(21) Appl. No.: 15/003,584

(22) Filed: Jan. 21, 2016

(65) Prior Publication Data

US 2016/0218572 A1    Jul. 28, 2016

(30) Foreign Application Priority Data

Jan. 23, 2015    (JP) .................................. 2015-11406

(51) Int. Cl.
*H02K 1/18*    (2006.01)
*H02K 5/10*    (2006.01)
*H02K 5/04*    (2006.01)
*H02K 5/15*    (2006.01)

(52) U.S. Cl.
CPC ................. *H02K 5/10* (2013.01); *H02K 5/15* (2013.01); *H02K 1/185* (2013.01); *H02K 5/04* (2013.01)

(58) Field of Classification Search
CPC ............ H02K 5/10; H02K 1/185; H02K 5/04; H02K 5/15
USPC ........................................................ 310/432
See application file for complete search history.

(56) References Cited

U.S. PATENT DOCUMENTS

| 2,023,259 A * | 12/1935 | Anderson ............... H02K 1/185 |
| | | 310/402 |
| 2007/0273242 A1* | 11/2007 | Okumoto .................. H02K 5/15 |
| | | 310/263 |
| 2013/0187517 A1* | 7/2013 | Asao ....................... H02K 1/185 |
| | | 310/68 D |
| 2014/0021831 A1* | 1/2014 | Hayashi ................... H02K 5/22 |
| | | 310/432 |
| 2014/0036559 A1 | 2/2014 | Watanabe et al. |

(Continued)

FOREIGN PATENT DOCUMENTS

| JP | H07-123649 A | 5/1995 |
| JP | 2001-193629 A | 7/2001 |

(Continued)

*Primary Examiner* — Alex W Mok
(74) *Attorney, Agent, or Firm* — Knobbe, Martens, Olson & Bear, LLP (57) ABSTRACT

A first end contact portion of a first frame end contacts one end surface of a stator core. A second end contact portion of a second frame end contacts the other end surface of the stator core and includes an inner tubular part, which contacts the other end surface of the stator core, and a fixing part, which projects radially outward from the inner tubular part and contacts the other end surface. A through-bolt is threaded into the fixing part. An outer diameter of the one end surface is smaller than an outer diameter of an opposing surface of the first end contact portion. An outer diameter of an opposing surface of the inner tubular part is smaller than an outer diameter of the other end surface. A yoke of the stator core includes a relief groove, into which a portion of the through-bolt is fitted.

3 Claims, 13 Drawing Sheets (56) References Cited

U.S. PATENT DOCUMENTS

| | | | | |
|---|---|---|---|---|
| 2014/0152142 A1* | 6/2014 | Terashita | ............... | H02K 5/04 310/216.113 |
| 2014/0167559 A1* | 6/2014 | Eike | ............... | H02K 15/00 310/216.131 |
| 2014/0210306 A1* | 7/2014 | Suzuki | ............... | H02K 1/185 310/216.134 |

FOREIGN PATENT DOCUMENTS

| | | |
|---|---|---|
| JP | 2005-45904 A | 2/2005 |
| JP | 2009-67522 A | 4/2009 |
| JP | 2011-193629 A | 9/2011 |
| JP | 2014-107916 A | 6/2014 |

* cited by examiner

ELECTRIC MOTOR FOR POWER STEERING APPARATUS OF VEHICLE

CROSS REFERENCE TO RELATED APPLICATION

This application is based on and incorporates herein by reference Japanese Patent Application No. 2015-11406 filed on Jan. 23, 2015.

TECHNICAL FIELD

The present disclosure relates to an electric motor used as a drive source of a power steering apparatus of a vehicle.

BACKGROUND

For example, JP2014-107916A discloses an electric motor, in which a stator core is axially held between two frame ends. These frame ends are fixed together by fixture elements, such as bolts, to eliminate a case that covers an outer side of the stator core. The number of the components and the number of assembling steps can be advantageously reduced by eliminating the case.

In the case where the above electric motor is used as the drive source of the power steering apparatus of the vehicle, it may not be required to provide a complete waterproof function depending on an installation location of the electric motor in the vehicle. Therefore, it is desirable to manufacture the electric motor at lower costs by simplifying the structure of the electric motor through elimination of the waterproof function. However, although the waterproof function may not be required, it is required to have a drip-proof function to limit intrusion of water into an inside of the electric motor in a case where the water adheres to the electric motor due to, for example, dew condensation.

In the electric motor of JP2014-107916A, the intrusion of the water into the inside of the electric motor may be significantly limited by simply closing a hole formed in the frame end. However, the frame end is fitted to the outer side of the stator core. Therefore, in a case where the electric motor is installed in the vehicle in such a manner that an axis of a rotatable shaft of the electric motor extends in a direction that is parallel to or slightly tilted relative to a direction of gravitational force, water tends to be accumulated at a corner between a fitting portion of the lower frame end, which is located on the lower side in the direction of gravitational force, and the stator core. Therefore, although the water may not immediately penetrate into the inside of the electric motor, the water may disadvantageously penetrate into the inside of the electric motor through a boundary between adjacent two components of the electric motor when expansion and contraction of the components caused by a temperature change are repeated.

In order to address the above disadvantage, the inventor of the present application has proposed to provide a tubular portion, which has a maximum outer diameter smaller than a maximum outer diameter of the stator core and contacts the stator core, to the lower frame end located at the lower side in the direction of gravitational force upon installation of the electric motor to the vehicle. In this way, the water, which flows along an outer wall surface of the stator core, is less likely to be accumulated at a corner between the stator core and the tubular portion. However, a contact location (the tubular portion) between the lower frame end and the stator core is radially inwardly displaced from the fixation locations of the bolts at the lower frame end. Thereby, the frame end may be flexed (or warped) by the axial force of the bolt, so that a gap is formed between the frame end and the stator core, and the water may possibly enter the inside of the electric motor through the gap.

SUMMARY

The present disclosure is made in view of the above disadvantage. According to the present disclosure, there is provided an electric motor for a power steering apparatus of a vehicle, including a rotatable shaft, a rotor, a stator core, a plurality of coils, a first frame end, a second frame end and a fixture element. The rotor is fixed to the rotatable shaft. The stator core is shaped into a tubular form and is placed on a radially outer side of the rotor. The coils are installed to a plurality of slots of an inner peripheral portion of the stator core. The first frame end is placed on one axial side of the stator core and contacts one end surface of an outer peripheral portion of the stator core. The first frame end rotatably supports one end portion of the rotatable shaft. The second frame end is placed on another axial side of the stator core and contacts another end surface of the outer peripheral portion of the stator core, which is axially opposite from the one end surface, to hold the stator core between the first frame end and the second frame end. The second frame end is placed on another axial side of the stator core and contacts another end surface of the outer peripheral portion of the stator core to hold the stator core between the first frame end and the second frame end. The second frame end rotatably supports another end portion of the rotatable shaft. The fixture element fixes the first frame end and the second frame end together. The electric motor serves as a drive source of the power steering apparatus and is to be installed to the vehicle in such a manner that the another end portion of the rotatable shaft is placed on a lower side of the one end portion of the rotatable shaft in a direction of gravitational force, and an outer wall surface of the stator core, which is located at a radially outer side, is exposed to an outside of the electric motor. An end portion of the first frame end, which contacts the one end surface, is defined as a first end contact portion. An end portion of the second frame end, which contacts the another end surface, is defined as a second end contact portion. The second end contact portion includes an inner tubular part, which contacts the another end surface, and a fixing part, which projects radially outward from the inner tubular part and contacts the another end surface. The fixture element is engaged with the fixing part. A maximum outer diameter of the one end surface is smaller than a maximum outer diameter of a first opposing surface, which is an opposing surface of the first end contact portion that is opposed to the stator core. A maximum outer diameter of a second opposing surface, which is an opposing surface of the inner tubular part that is opposed to the stator core, is smaller than a maximum outer diameter of the another end surface. The outer peripheral portion of the stator core includes a relief groove, which is radially inwardly recessed. The fixture element is placed such that at least a portion of the fixture element, which is radially located on a side where the stator core is placed, is fitted into the relief groove.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings. In the following discussion of the embodiments, similar components will be indicated by the same reference numerals and will not be described redundantly for the sake of simplicity.

First Embodiment

Figure 1:
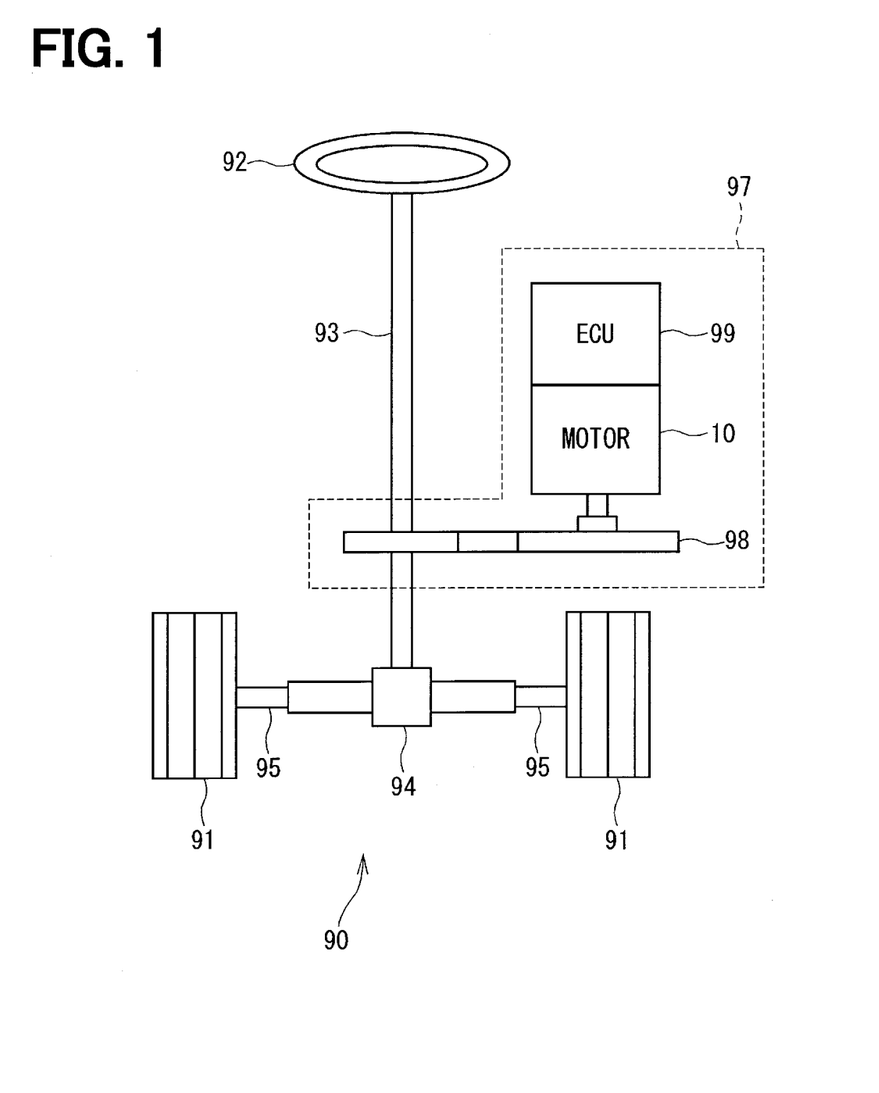
FIG. 1 is a schematic diagram showing a power steering apparatus of a vehicle that has an electric motor according to a first embodiment of the present disclosure as a drive source of the power steering apparatus.

An electric motor of a first embodiment of the present disclosure is used as a drive source of a power steering apparatus 97 of a vehicle shown in FIG. 1. The power steering apparatus 97 is provided in a steering system 90. The steering system 90 is a system that drives wheels 91 to change a traveling direction of the vehicle. The steering system 90 includes a steering wheel 92, a steering shaft 93, a rack and pinion mechanism 94 and tie rods 95. Rotational motion, which is transmitted from the steering wheel 92 to the steering shaft 93, is converted into linear motion through the rack and pinion mechanism 94 and is then conducted to the wheels 91 to change an orientation of the wheels 91. The power steering apparatus 97 is an apparatus that assists a steering operation of a driver of the vehicle.

The power steering apparatus 97 includes an electric motor (hereinafter simply referred to as a motor) 10, a speed reducing device 98 and an electronic control unit (ECU) 99. The speed reducing device 98 reduces a speed of the rotation transmitted from the motor 10 and transmits the rotation of the reduced speed to the steering shaft 93. The electronic control unit 99 serves as a controller that controls a driving operation of the motor 10. The motor 10 is a caseless motor, in which a stator core 13 is held by two frame ends 15, 16 that are placed on two axial sides, respectively, of the stator core 13, and a case, which covers an outer side of the stator core 13, is eliminated.

Figure 2:
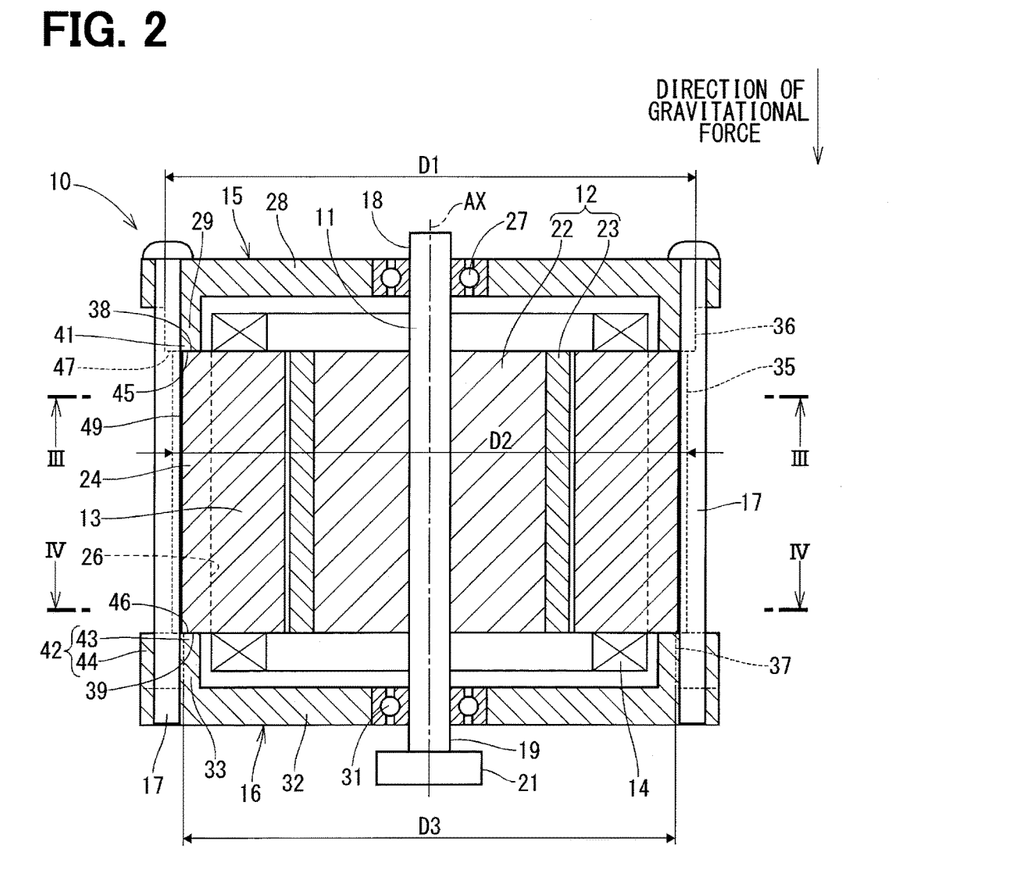
FIG. 2 is a cross-sectional view schematically showing a longitudinal cross section of the electric motor of FIG. 1.

First of all, an entire structure of the motor 10 will be described with reference to FIGS. 2 and 3. FIG. 2 indicates the motor 10 that is oriented to coincide with an orientation of the motor 10 in an installed state of the motor 10 in the vehicle where the vehicle, to which the motor 10 is installed, is placed on a planar surface, which is parallel to a horizontal plane that is perpendicular to the direction of gravitational force.

Figure 3:
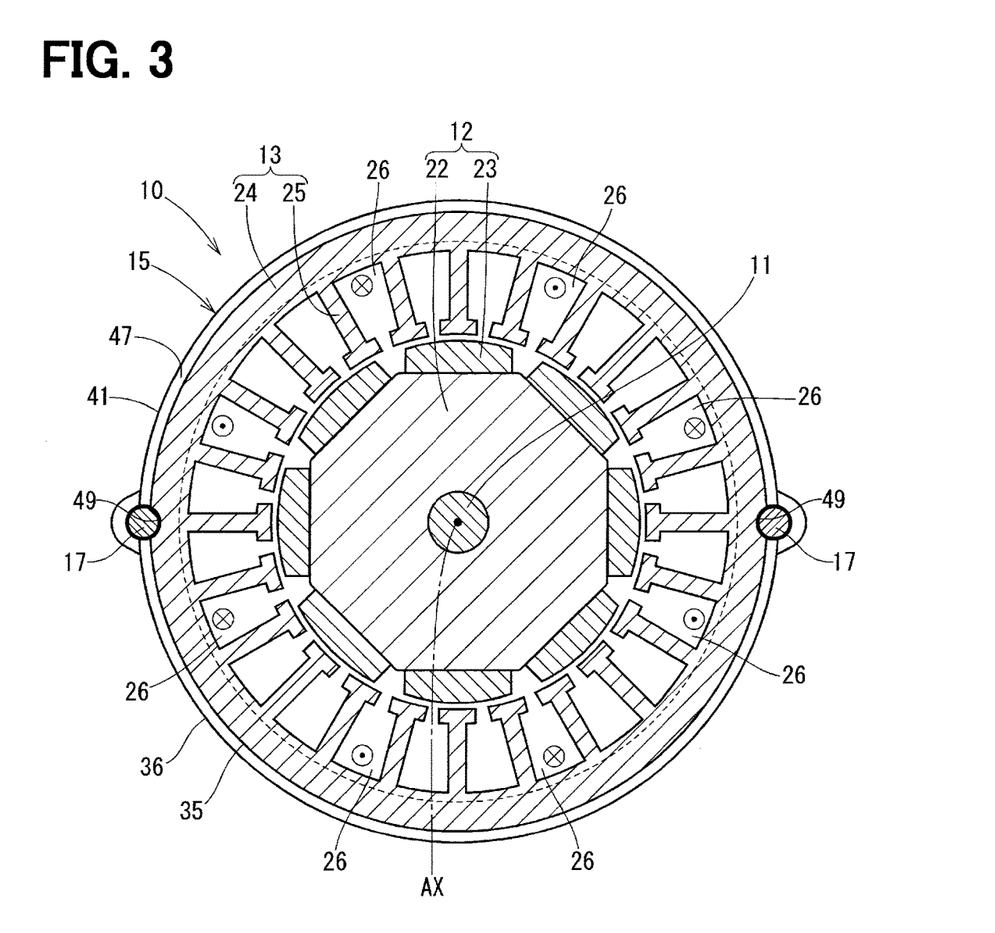
FIG. 3 is a cross sectional view taken along line III-III in FIG. 2.

As shown in FIGS. 2 and 3, the motor 10 includes a rotatable shaft 11, a rotor 12, the stator core 13, a plurality of coils 14, a first frame end 15, a second frame end 16 and a plurality of through-bolts (serving as fixture elements) 17.

One end portion 18 and another end portion (hereinafter referred to as the other end portion) 19 of the rotatable shaft 11 are placed such that the other end portion 19 is placed on a lower side of the one end portion 18 in a direction of gravitational force in a state where the vehicle, to which the motor 10 is installed, is placed on the planar surface, which is parallel to the horizontal plane. In the present embodiment, an axis AX of the rotatable shaft 11 is parallel to the direction of gravitational force. A joint 21 is formed in the other end portion 19.

The rotor 12 includes a rotor core 22 and a plurality of magnetic poles (permanent magnets) 23. The rotor core 22 is secure to the rotatable shaft 11 by, for example, press-fitting. The magnetic poles 23 are placed one after another in a circumferential direction on a radially outer side of the rotor core 22. The rotatable shaft 11 is rotated integrally with the rotor 12. The rotor 12 of the above-described type is known as an inner rotor type.

The stator core 13 is shaped into a tubular form and is placed on a radially outer side of the rotor 12. An outer peripheral portion of the stator core 13 forms a yoke 24, which is shaped into a tubular form. An inner peripheral portion of the stator core 13 forms a plurality of teeth 25, which radially inwardly project from the yoke 24 and are arranged one after another in the circumferential direction. A slot 26 is formed between each circumferentially adjacent two of the teeth 25. An outer wall surface 35 of the stator core 13, which is located at a radially outer side of the stator core 13, is exposed to an outside of the motor 10. In the present embodiment, the stator core 13 is formed by stacking a plurality of metal sheets in an axial direction. In FIG. 2, for the sake of simplicity, the stator core 13 is indicated as a one-piece member.

The coils 14 are installed to the slots 26 of the inner peripheral portion of the stator core 13. In the present embodiment, the coils 14 include three-phase coils, i.e., a U-phase coil, a V-phase coil, and a W-phase coil. In FIG. 3, the coils 14 are not indicated for the sake of the simplicity, and only flow directions of an electric current in the U-phase coil are indicated in FIG. 3.

The first frame end 15 is placed on one axial side of the stator core 13 and contacts one end surface 38 of the yoke 24 of the stator core 13. The first frame end 15 rotatably supports the one end portion 18 of the rotatable shaft 11 through a bearing 27. In the present embodiment, the first frame end 15 includes a base portion 28 and a projection 29. The base portion 28 is shaped into a circular disk form, and the bearing 27 is installed in a center part of the base portion 28. The projection 29 is shaped into a tubular form and axially projects from the base portion 28 toward the stator core 13. A distal end part of the projection 29 contacts the one end surface 38.

The second frame end 16 is placed on the other axial side of the stator core 13 and contacts another end surface (hereinafter referred to as the other end surface) 39 of the yoke 24, which is axially opposite from the one end surface 38 of the yoke 24. Furthermore, the second frame end 16 cooperates with the first frame end 15 to hold the stator core 13 between the second frame end 16 and the first frame end 15. The second frame end 16 rotatably supports the other end portion 19 of the rotatable shaft 11 through a bearing 31. In the present embodiment, the second frame end 16 includes a base portion 32 and a projection 33. The base portion 32 is shaped into a circular disk form, and the bearing 31 is installed in a center part of the base portion 32. The projection 33 is shaped into a tubular form and axially projects from the base portion 32 toward the stator core 13. A distal end part of the projection 33 contacts the other end surface 39.

The through-bolts 17 fix the first frame end 15 and the second frame end 16 together. In the present embodiment, the number of the through-bolts 17 is, for example, two, and these two through-bolts 17 are placed at two circumferential locations, respectively.

In the motor 10, which is constructed in the above-described manner, when the electric current is sequentially conducted through the coils of the three-phases, a rotating magnetic field is generated. The rotor 12 is attracted by the rotating magnetic field and is thereby rotated.

Next, a characteristic structure of the motor 10 will be described with reference to FIGS. 2 to 6. In the following discussion, an end portion of the first frame end 15 (more specifically, an end portion of the projection 29), which contacts the one end surface 38 of the stator core 13, will be referred to as a first end contact portion 41. Furthermore, an end portion of the second frame end 16 (more specifically, an end portion of the projection 33), which contacts the other end surface 39 of the stator core 13, will be referred to as a second end contact portion 42.

As shown in FIG. 2, the second end contact portion 42 includes an inner tubular part 43 and a plurality (two in this instance) of fixing parts 44. The inner tubular part 43 contacts the other end surface 39. Each of the fixing parts 44 projects radially outward from the inner tubular part 43 and contacts the other end surface 39. Each of the through-bolts 17 is threaded into the corresponding one of the fixing parts 44 and is thereby engaged with the corresponding one of the fixing parts 44.

Figure 5:
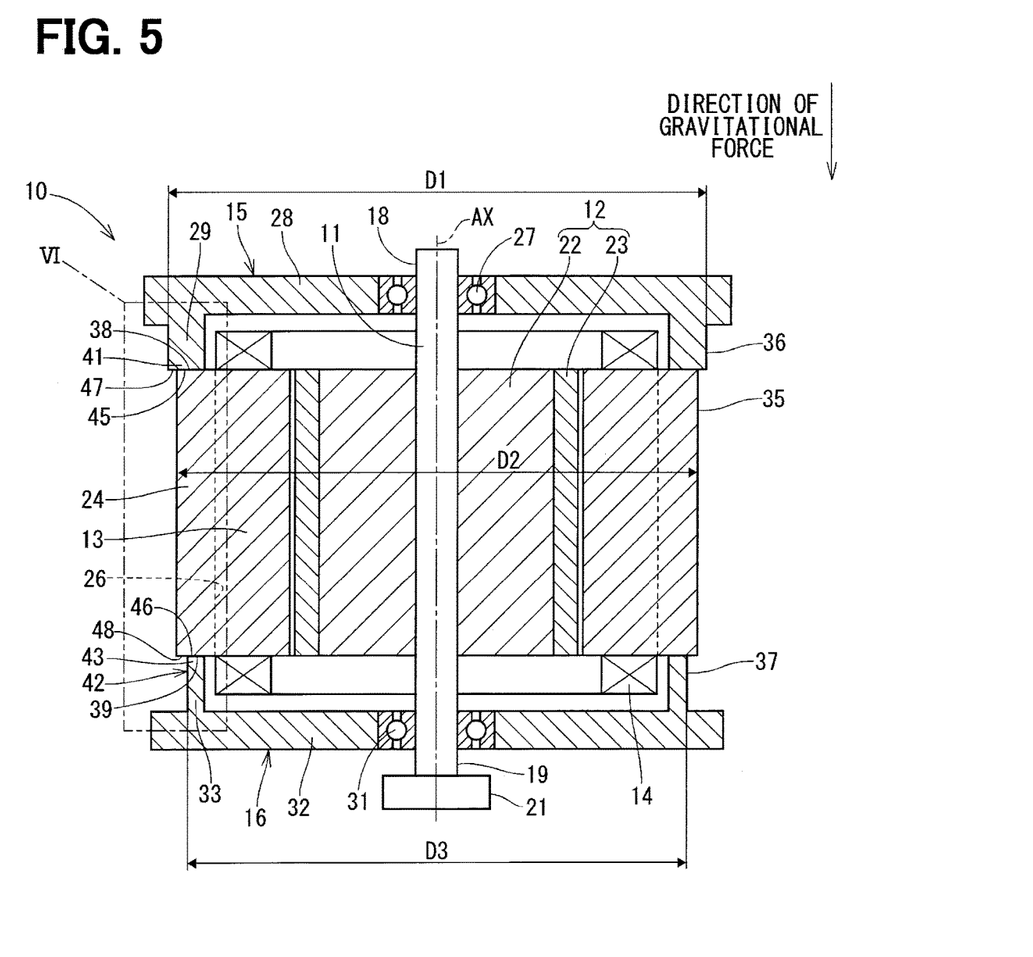
FIG. 5 is a cross-sectional view taken along line V-V in FIG. 4.

As shown in FIGS. 2 and 5, a maximum outer diameter of the one end surface 38 and a maximum outer diameter of the other end surface 39 are the same as a maximum outer diameter D2 of the stator core 13. The maximum outer diameter D2 of the one end surface 38 is smaller than a maximum outer diameter D1 of an opposing surface 45 of the first end contact portion 41 that is opposed to the stator core 13. The opposing surface 45 serves as a first opposing surface of the present disclosure. Thereby, the outer diameter of the first end contact portion 41 and the outer diameter of the stator core 13 are sequentially reduced in this order toward the lower side in the direction of gravitational force in the state where the motor 10 is installed to the vehicle.

Furthermore, the maximum outer diameter D3 of an opposing surface 46 of the inner tubular part 43, which is opposed to the stator core 13, is smaller than the maximum outer diameter D2 of the other end surface 39. The opposing surface 46 serves as a second opposing surface of the present disclosure. Thereby, the outer diameter of the stator core 13 and the outer diameter of the inner tubular part 43 are sequentially reduced in this order toward the lower side in the direction of gravitational force in the state where the motor 10 is installed to the vehicle.

Figure 6:
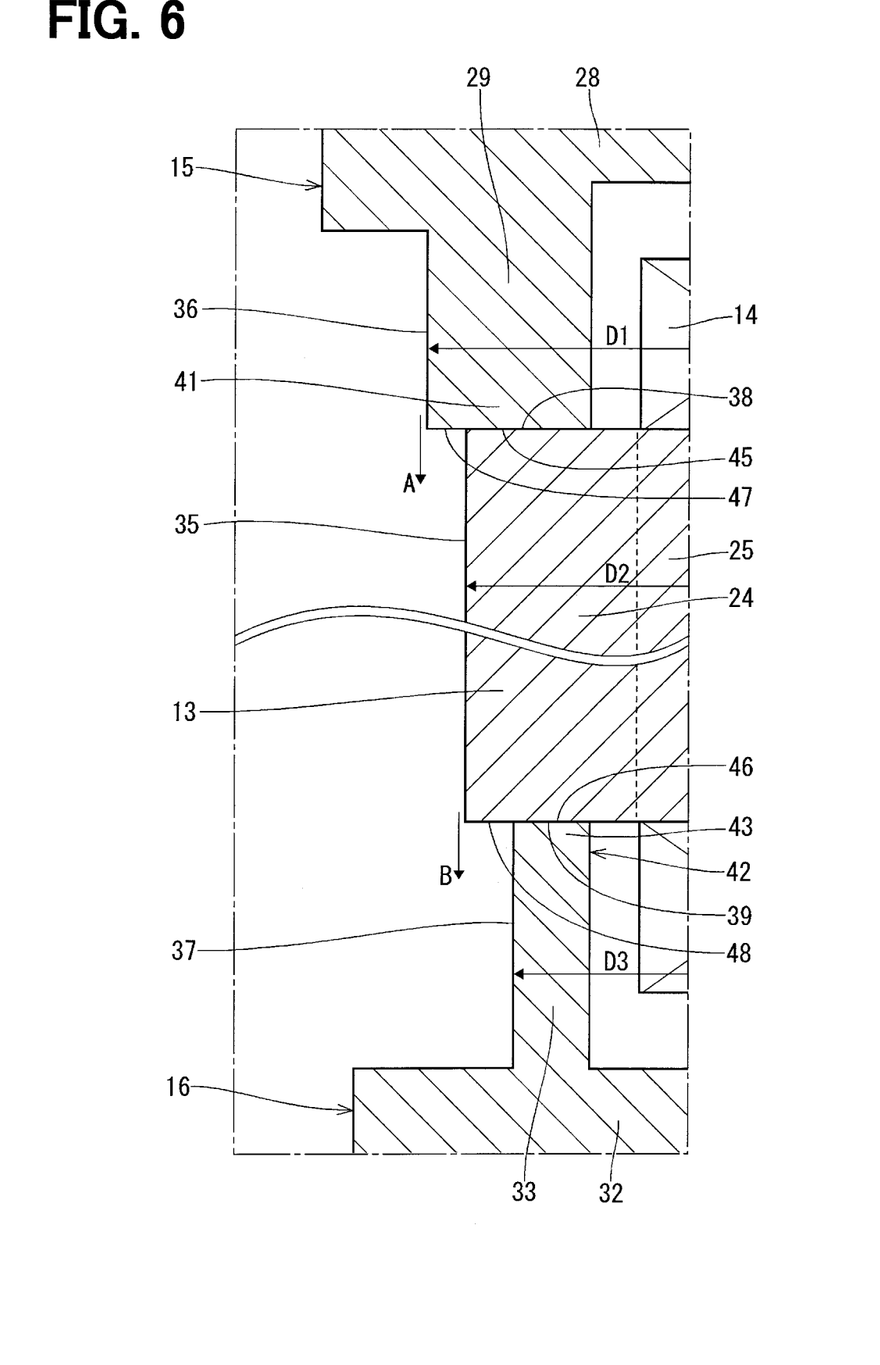
FIG. 6 is a partial enlarged view showing an area VI in FIG. 5.

As shown in FIGS. 3, 5 and 6, an outer peripheral edge (radially outer edge) of the one end surface 38 is located on a radially inner side of an outer peripheral edge (radially outer edge) of the opposing surface 45 along an entire circumferential extent of the one end surface 38. In this way, an exposed portion of the opposing surface 45, which is exposed to the outside, is directed toward the lower side in the direction of gravitational force along the entire circumferential extent of the exposed portion of the opposing surface 45. That is, a step surface 47 between the first end contact portion 41 and the stator core 13 is directed toward the lower side in the direction of gravitational force along the entire circumferential extent of the step surface 47.

Figure 4:
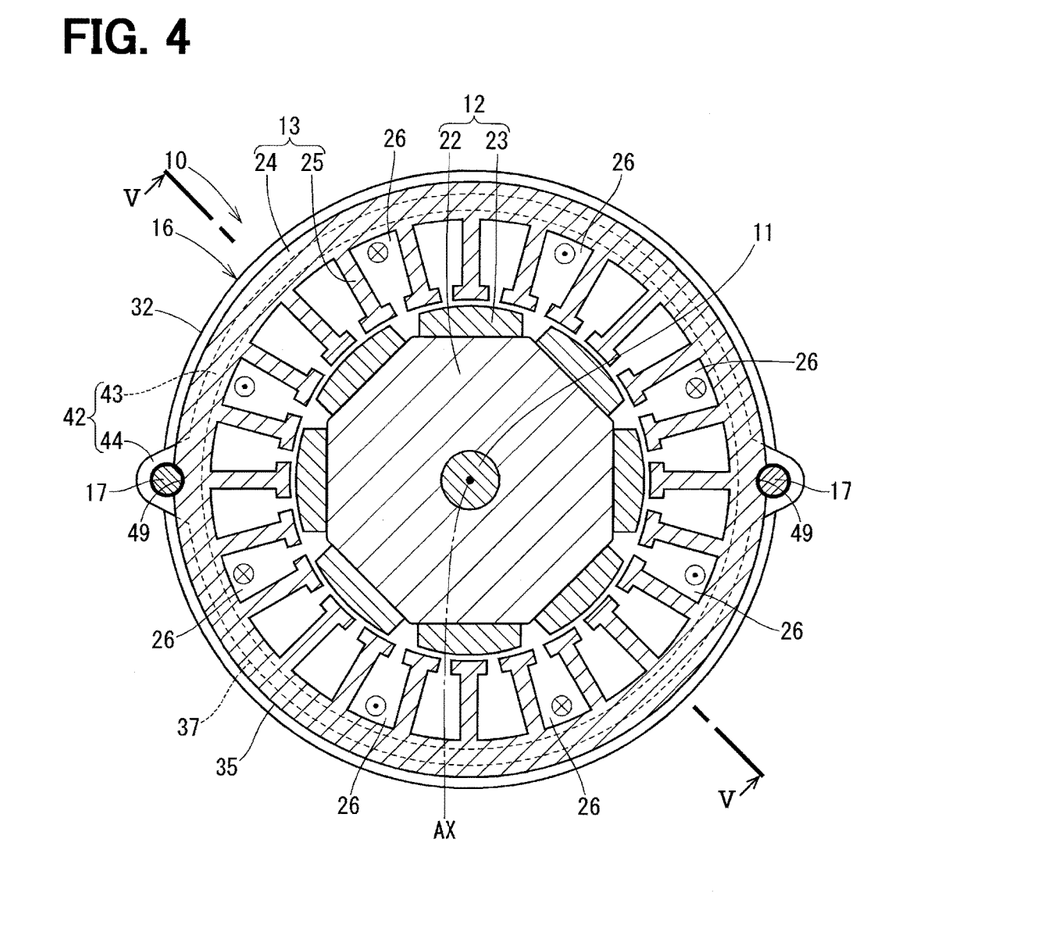
FIG. 4 is a cross-sectional view taken along line IV-IV in FIG. 2.

As shown in FIGS. 4, 5 and 6, an outer peripheral edge (radially outer edge) of the opposing surface 46 is located on a radially inner side of an outer peripheral edge (radially outer edge) of the other end surface 39 along an entire circumferential extent of the opposing surface 46. In this way, an exposed portion of the opposing surface 46, which is exposed to the outside, is directed toward the lower side in the direction of gravitational force along the entire circumferential extent of the exposed portion of the opposing surface 46. That is, a step surface 48 between the stator core 13 and the inner tubular part 43 is directed toward the lower side in the direction of gravitational force along the entire circumferential extent of the step surface 48.

In the present embodiment, the outer wall surface 35 of the stator core 13 is a cylindrical surface. Furthermore, an outer wall surface 36 of the first end contact portion 41, which is located at a radially outer side of the first end contact portion 41, is a cylindrical surface, and an outer wall surface 37 of the inner tubular part 43, which is located at a radially outer side of the inner tubular part 43, is also a cylindrical surface. The outer wall surfaces 35, 36, 37 are coaxial with each other.

As shown in FIGS. 2 and 4, the yoke 24 of the stator core 13 includes a plurality (two in this instance) of relief grooves 49, each of which is radially inwardly recessed. Each relief groove 49 is a groove that linearly extends from the one end surface to the other end surface of the stator core 13 in the axial direction. Each through-bolt 17 is placed such that at least a portion of the through-bolt 17, which is radially located on a side where the stator core 13 is placed, is fitted into the corresponding relief groove 49.

Now, advantages of the motor 10 of the present embodiment will be described.

As discussed above, in the first embodiment, the motor 10 is the drive source of the power steering apparatus 97 of the vehicle. The motor 10 is installed to the vehicle in such a manner that the other end portion 19 of the rotatable shaft 11 is placed on the lower side of the one end portion 18 of the rotatable shaft 11 in the direction of gravitational force, and the outer wall surface 35 of the stator core 13 is exposed to the outside of the motor 10. The second end contact portion 42 includes the inner tubular part 43 and the fixing parts 44. The inner tubular part 43 contacts the other end surface 39 of the stator core 13. Each of the fixing parts 44 projects radially outward from the inner tubular part 43 and contacts the other end surface 39. Each of the through-bolts 17 is threaded into the corresponding one of the fixing parts 44. The maximum outer diameter D2 of the one end surface 38 is smaller than the maximum outer diameter D1 of the opposing surface 45. The maximum outer diameter D3 of the opposing surface 46 is smaller than the maximum outer diameter D2 of the other end surface 39. The yoke 24 of the stator core 13 includes the relief grooves 49, each of which is radially inwardly recessed. Each through-bolt 17 is placed such that at least the portion of the through-bolt 17, which is radially located on the side where the stator core 13 is placed, is fitted into the corresponding relief groove 49.

As discussed above, when the components are arranged such that the outer diameters of the components are sequentially reduced from the upper side toward the lower side upon installation of the motor to the vehicle, the water is less likely to be accumulated at a corner between the upper side component and the lower side component. Specifically, when the maximum outer diameter of the opposing surface 45 and the maximum outer diameter of the one end surface 38 are sequentially reduced in this order, the water is less likely to be accumulated in the corner between the first end contact portion 41 and the stator core 13. Furthermore, when the maximum outer diameter of the other end surface 39 and the maximum outer diameter of the opposing surface 46 are sequentially reduced in this order, the water is less likely to be accumulated at the corner between the stator core 13 and the inner tubular part 43. As indicated by arrows A, B in FIG. 6, the water falls downward.

When the outer diameter of the inner tubular part 43 is reduced, a contact location, at which the second frame end 16 and the stator core 13 contact with each other, is displaced toward the radially inner side. However, in the present embodiment, the relief grooves 49 are formed in the stator core 13, and a portion of each of the through-bolts 17 is fitted into the corresponding relief groove 49. Therefore, fixing locations of the second frame end 16 can be radially placed closer to the contact location (the inner tubular part 43) between the second frame end 16 and the stator core 13. Therefore, it is possible to limit generation of a gap between the inner tubular part 43 and the stator core 13 caused by flexing of the second frame end 16 through application of axial forces of the through-bolts 17.

Furthermore, a special seal structure (a dedicated seal structure) is not formed between each frame end 15, 16 and the stator core 13.

Therefore, according to the first embodiment, the structure is simple, and it is possible to limit intrusion of the water into the inside of the motor 10.

Furthermore, according to the first embodiment, the outer peripheral edge of the one end surface 38 is located on the radially inner side of the outer peripheral edge of the opposing surface 45 along the entire circumferential extent of the one end surface 38. In this way, the step surface 47 between the first end contact portion 41 and the stator core 13 is directed toward the lower side in the direction of gravitational force along the entire circumferential extent of the step surface 47. Thus, the water is less likely to be accumulated in the corner between the first end contact portion 41 and the stator core 13. Thereby, the amount of water intruded into the inside of the motor 10 can be further reduced.

Furthermore, according to the first embodiment, the outer peripheral edge of the opposing surface 46 is located on the radially inner side of the outer peripheral edge of the other end surface 39 along the entire circumferential extent of the opposing surface 46. In this way, the step surface 48 between the stator core 13 and the inner tubular part 43 is directed toward the lower side in the direction of gravitational force along the entire circumferential extent of the step surface 48. Thus, the water is less likely to be accumulated in the corner between the stator core 13 and the second end contact portion 42. Thereby, the amount of water intruded into the inside of the motor 10 can be further reduced.

Second Embodiment

Figure 7:
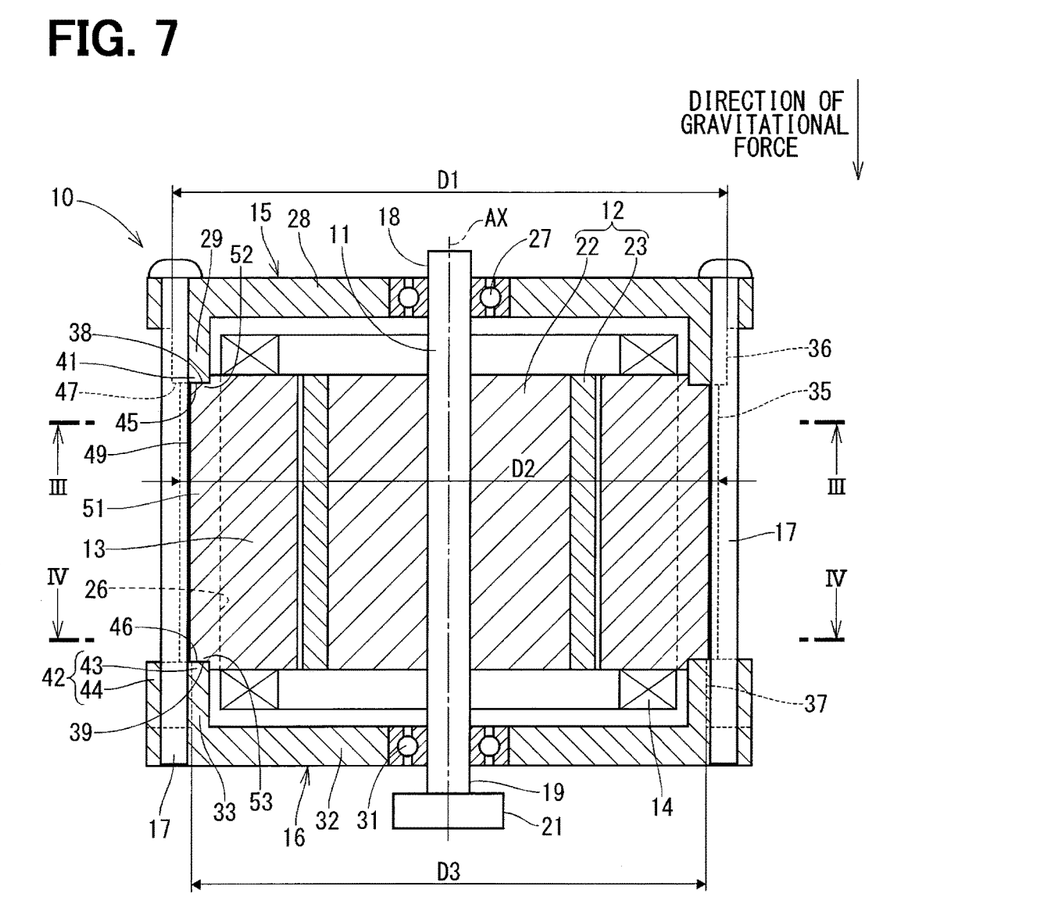
FIG. 7 is a cross-sectional view schematically showing a longitudinal-cross section of an electric motor according to a second embodiment of the present disclosure.

In a second embodiment of the present disclosure, as shown in FIG. 7, a radially outer side part of the one end portion of the yoke 51 located on the first frame end 15 side is axially placed on the second frame end 16 side of a radially inner side part of the one end portion of the yoke 51 and thereby forms a stepped part 52. The first end contact portion 41 is fitted to the stepped part 52. As discussed above, by fitting the first end contact portion 41 to the stepped part 52, it is possible to effectively position the first frame end 15 and the stator core 13 relative to each other in the radial direction.

Furthermore, a radially outer side part of the other end portion of the yoke 51 located on the second frame end 16 side is axially placed on the first frame end 15 side of a radially inner side part of the other end portion of the yoke 51 and thereby forms a stepped part 53. The second end contact portion 42 is fitted to the stepped part 53. As discussed above, by fitting the second end contact portion 42 to the stepped part 53, it is possible to effectively position the second frame end 16 and the stator core 13 relative to each other in the radial direction while the size of the inner tubular part 43 is made smaller than a size of the stator core 13.

Third Embodiment

Figure 8:
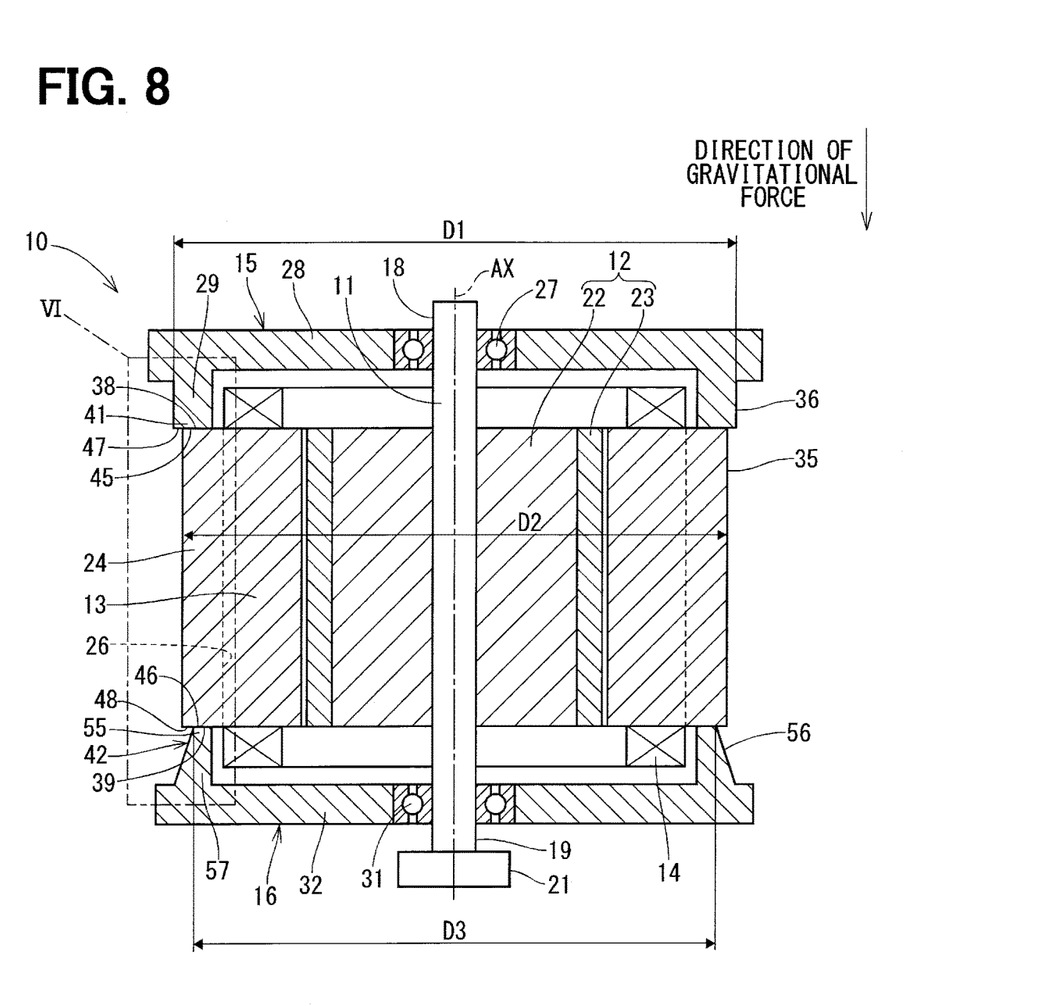
FIG. 8 is a cross-sectional view schematically showing a longitudinal-cross section of an electric motor according to a third embodiment of the present disclosure.
Figure 9:
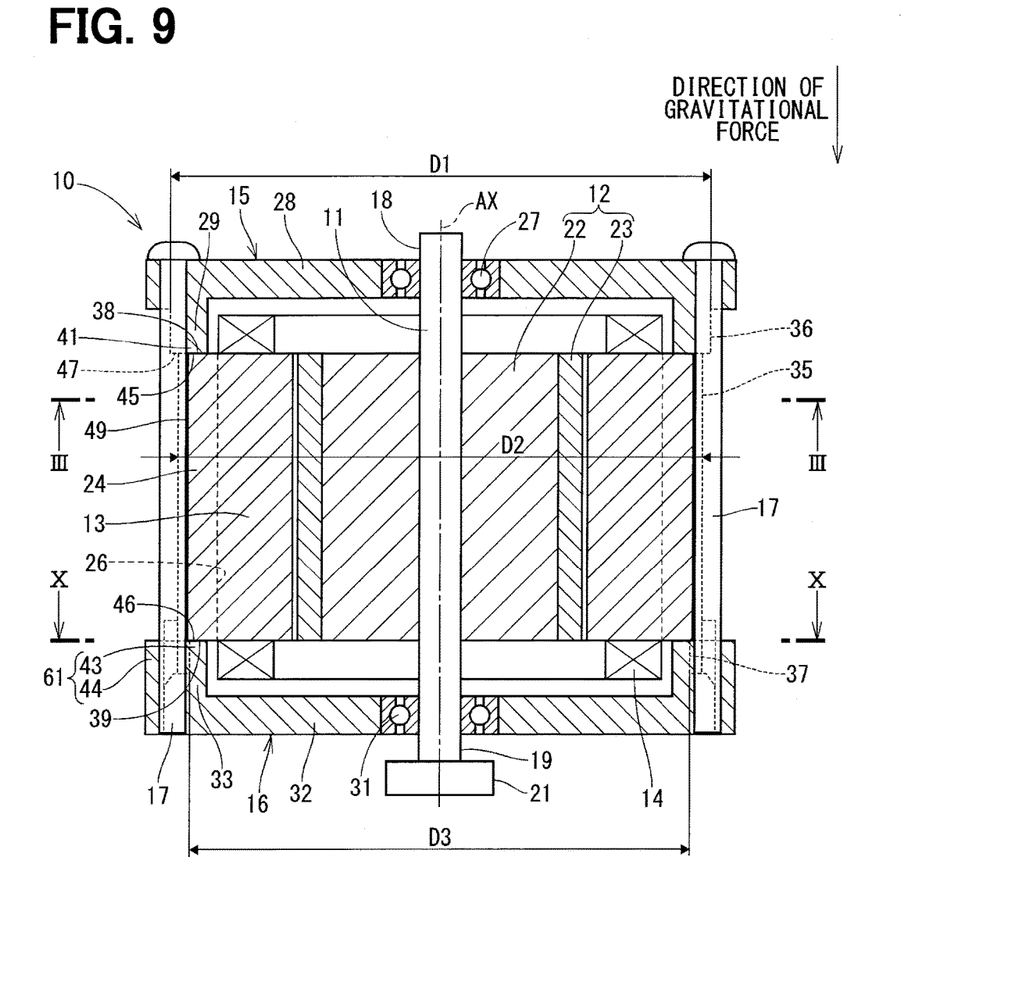
FIG. 9 is a cross-sectional view schematically showing a longitudinal-cross section of an electric motor according to a fourth embodiment of the present disclosure.
Figure 10:
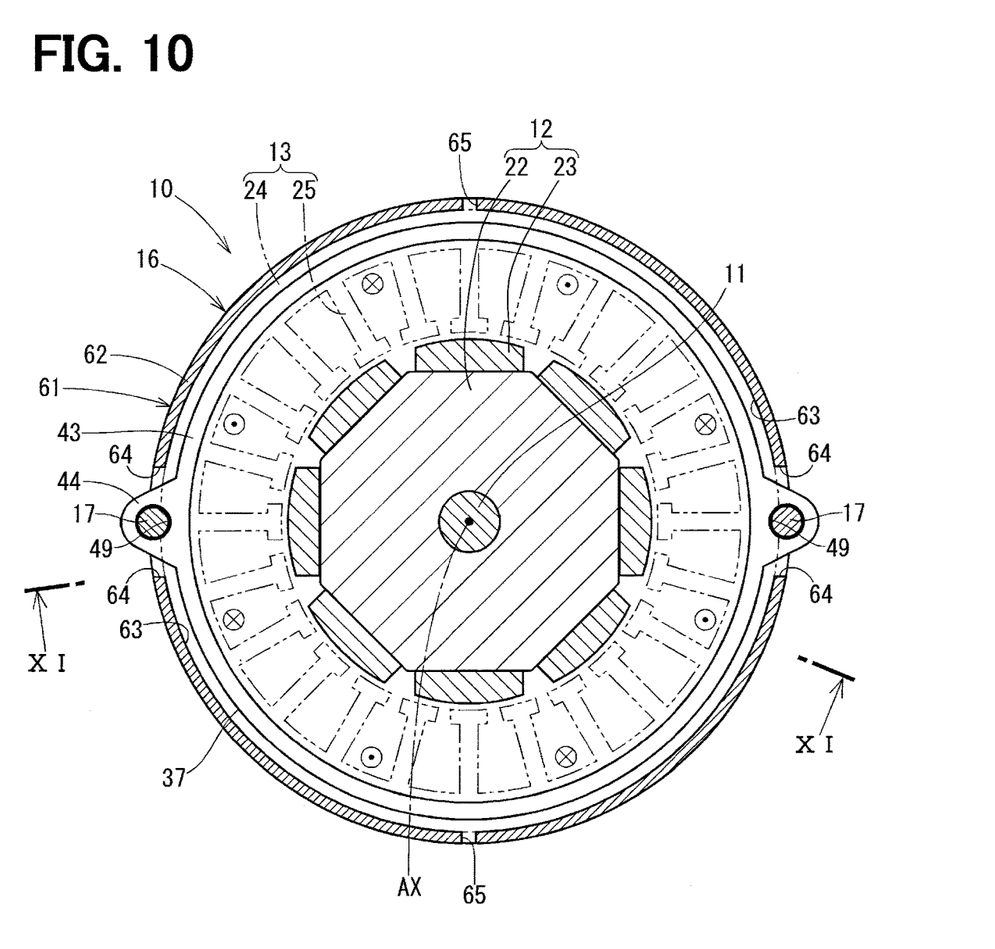
FIG. 10 is a cross-sectional view taken along line X-X in FIG. 9.
Figure 11:
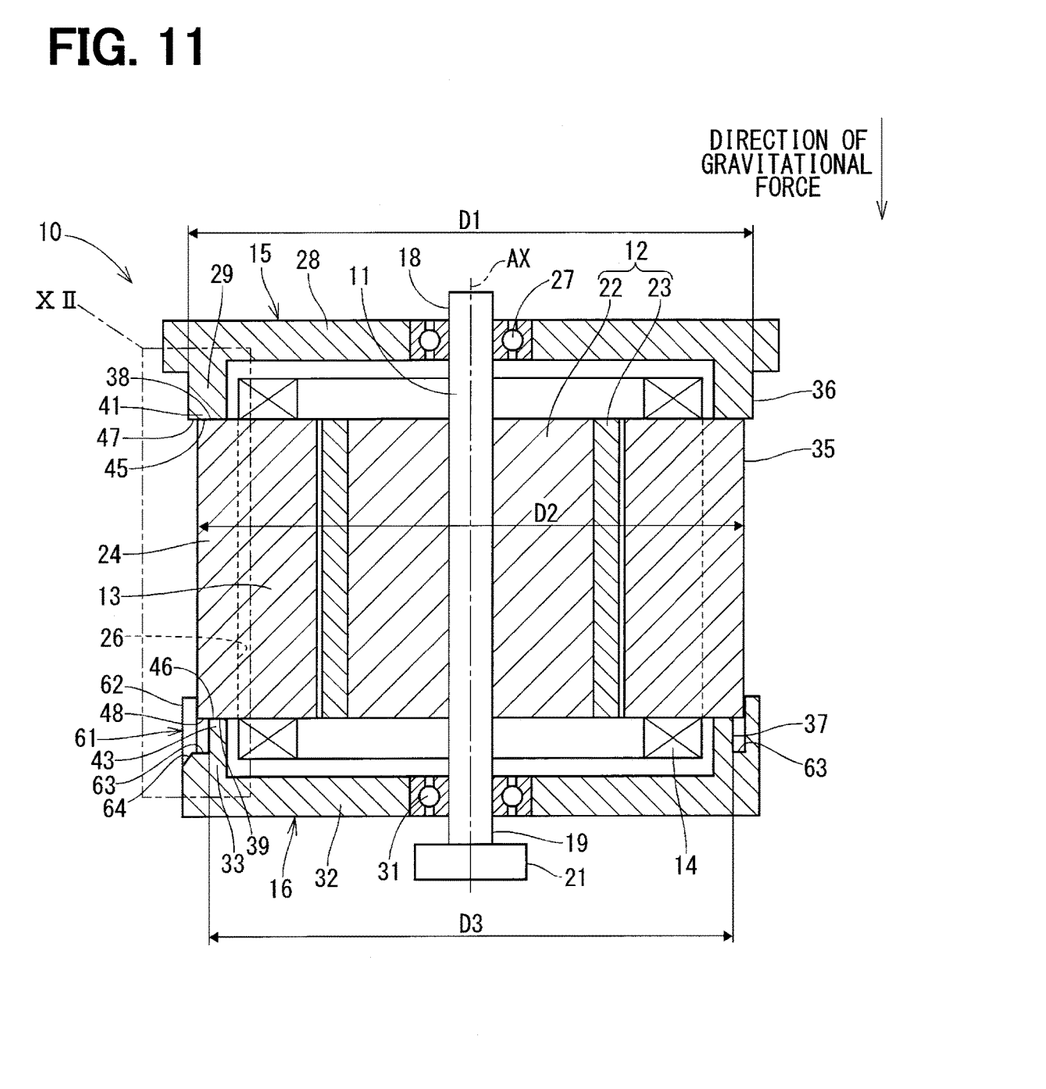
FIG. 11 is a cross-sectional view taken along line XI-XI in FIG. 10.
Figure 12:
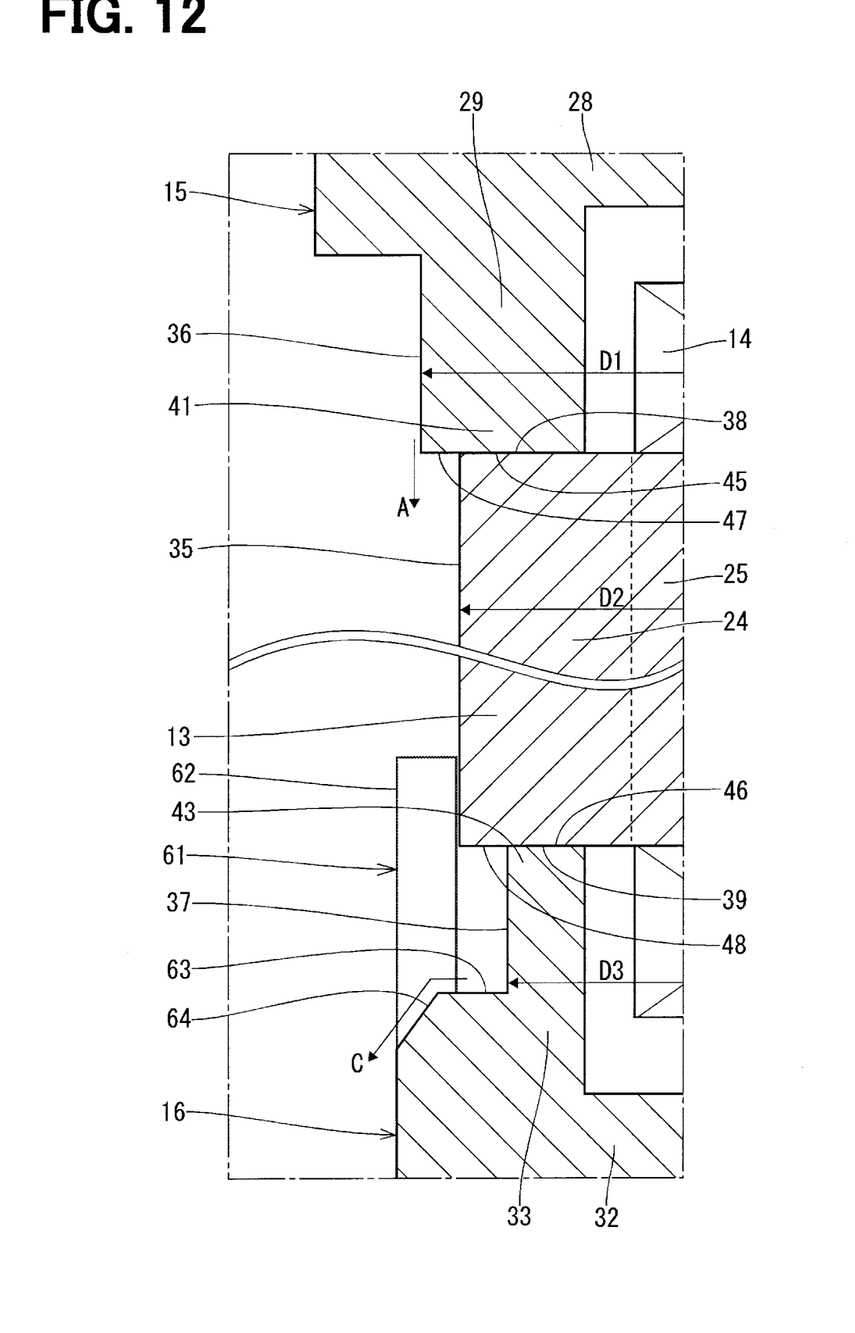
FIG. 12 is a partial enlarged view of an area XII in FIG. 11.

In a third embodiment of the present disclosure, as shown in FIG. 8, an outer wall surface 56 of the inner tubular part 55 is a tapered surface. That is, the projection 57 of the second frame end 16 is shaped such that a wall thickness of the projection 57, which is measured in the radial direction, is increased from a distal end part to a proximal end part of the projection 57. Therefore, the required rigidity of the projection 57 can be ensured.

Fourth Embodiment

In a fourth embodiment of the present disclosure, as shown in FIGS. 9 to 12, the second end contact portion 61 includes the inner tubular part 43, the fixing parts 44, an outer wall part (also referred to as an outer tubular part) 62, a circumferential groove 63, and a plurality of drain holes 64, 65 (more specifically, two drain holes 64 and two drain holes 65 in this instance). The outer wall part 62 is fitted to the outer side of the stator core 13. The circumferential groove 63 is radially located between the inner tubular part 43 and the outer wall part 62. Each of the drain holes 64, 65 radially outwardly extends from the circumferential groove 63 in such a manner that the drain hole 64, 65 radially extends through the outer wall part 62 and connects between the circumferential groove 63 and the outside space located at the outside of the motor 10. Each of the drain holes 64 is circumferentially placed adjacent to the corresponding one of the fixing parts 44. Each of the drain holes 65 is placed at or around a circumferential center location between the circumferentially adjacent two of the fixing parts 44.

The water, which flows downward along the outer wall surface 35 of the stator core 13, enters the circumferential groove 63 through a gap formed between the stator core 13 and the outer wall part 62. However, the outer diameter of the other end surface 39 and the outer diameter of the opposing surface 46 are sequentially reduced in this order toward the lower side in the direction of gravitational force in the state where the motor 10 is installed to the vehicle. Therefore, the water is less likely to be accumulated in the corner between the stator core 13 and the inner tubular part 43. Furthermore, the water, which enters the circumferential groove 63, is drained to the outside space through the drain holes 64, 65, as indicated by an arrow C in FIG. 12. Thus, according to the fourth embodiment, the stator core 13 and the second frame end 16 are advantageously positioned relative to each other in the radial direction through the engagement between the stator core 13 and the outer wall part 62, while the amount of water intruded into the inside of the motor 10 is reduced or minimized.

OTHER EMBODIMENTS

Figure 13:
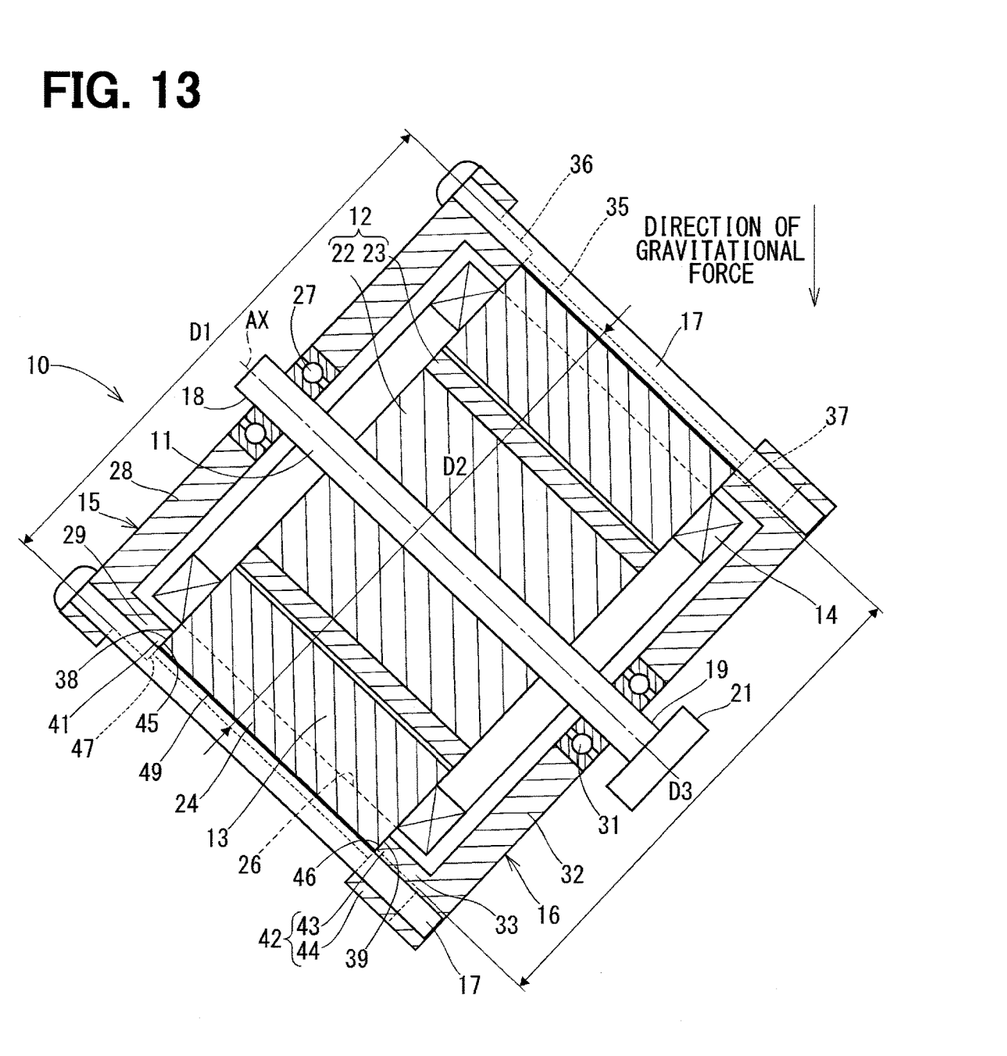
FIG. 13 is a cross-sectional view schematically showing a longitudinal-cross section of an electric motor according to another embodiment of the present disclosure.

In another embodiment of the present disclosure, the motor is not necessarily installed such that the rotatable shaft is parallel to the direction of gravitational force. That is, it is only required that the motor is installed to the vehicle in a state where the axis of the rotatable shaft crosses a horizontal line (or the horizontal plane) that is perpendicular to the direction of gravitational force, and thereby the end portion of the rotatable shaft, which is located on the second frame end side, is located on the lower side of the end portion of the rotatable shaft, which is located on the first frame end side, in the direction of gravitational force. For example, as shown in FIG. 13, the motor 10 may be installed to the vehicle such that the axis of the rotatable shaft 11 is tilted relative to the direction of gravitational force. Even with this structure, the water is less likely to be accumulated at the corner between each of the end contact portions and the stator core.

In another embodiment of the present disclosure, at least one of the magnetic poles (or all of the magnetic poles) and the rotor core may be made of a common member in the rotor.

In another embodiment of the present disclosure, the number of the through-bolts may be three or more, and these through-bolts may be provided at three or more circumferential locations, respectively.

The present disclosure is not limited the above embodiments. That is, the above embodiments may be further modified or combined in various ways without departing from the principle of the present disclosure.

What is claimed is:

1. An electric motor for a power steering apparatus of a vehicle, comprising:
   a rotatable shaft;
   a rotor that is fixed to the rotatable shaft;
   a stator core that is shaped into a tubular form and is placed on a radially outer side of the rotor;
   a plurality of coils that is installed to a plurality of slots of an inner peripheral portion of the stator core;
   a first frame end that is placed on one axial side of the stator core and contacts one end surface of an outer peripheral portion of the stator core, wherein the first frame end rotatably supports one end portion of the rotatable shaft;
   a second frame end that is placed on another axial side of the stator core and contacts another end surface of the outer peripheral portion of the stator core, which is axially opposite from the one end surface, to hold the stator core between the first frame end and the second frame end, wherein the second frame end rotatably supports another end portion of the rotatable shaft; and
   a fixture element that fixes the first frame end and the second frame end together, wherein:
   the electric motor serves as a drive source of the power steering apparatus and is to be installed to the vehicle in such a manner that the another end portion of the rotatable shaft is placed on a lower side of the one end portion of the rotatable shaft in a direction of gravitational force, and an outer wall surface of the stator core, which is located at a radially outer side, is exposed to an outside of the electric motor;
   an end portion of the first frame end, which contacts the one end surface, is defined as a first end contact portion;
   an end portion of the second frame end, which contacts the another end surface, is defined as a second end contact portion;
   the second end contact portion includes:
     an inner tubular part, which contacts the another end surface; and
     a fixing part, which projects radially outward from the inner tubular part and contacts the another end surface, wherein the fixture element is engaged with the fixing part;
   a maximum outer diameter of the one end surface is smaller than a maximum outer diameter of a first opposing surface, which is an opposing surface of the first end contact portion that is opposed to the stator core; and
   a maximum outer diameter of a second opposing surface, which is an opposing surface of the inner tubular part that is opposed to the stator core, is smaller than a maximum outer diameter of the another end surface;
   the outer peripheral portion of the stator core includes a relief groove, which is radially inwardly recessed; and
   the fixture element is placed such that at least a portion of the fixture element, which is radially located on a side where the stator core is placed, is fitted into the relief groove.

2. The electric motor according to claim 1, wherein:
   an outer peripheral edge of the one end surface is located on a radially inner side of an outer peripheral edge of the first opposing surface along an entire circumferential extent of the one end surface; and
   an outer peripheral edge of the second opposing surface is located on a radially inner side of an outer peripheral edge of the another end surface along an entire circumferential extent of the second opposing surface.

3. The electric motor according to claim 1, wherein the second end contact portion includes:
   an outer wall part that is fitted to an outer side of the stator core;
   a circumferential groove that is located between the inner tubular part and the outer wall part; and
   a drain hole that radially outwardly extends from the circumferential groove in such a manner that the drain hole connects between the circumferential groove and an outside space located at the outside of the electric motor.

* * * * *